(12) United States Patent
Toyoshima (10) Patent No.: US 6,907,456 B2
(45) Date of Patent: Jun. 14, 2005

(54) DEFAULT PORTAL SITE ACCESS WITH WIRELESS MODULE

(75) Inventor: Akihiko Toyoshima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 734 days.

(21) Appl. No.: 09/977,080

(22) Filed: Oct. 12, 2001

(65) Prior Publication Data

US 2002/0174190 A1 Nov. 21, 2002

Related U.S. Application Data

(60) Provisional application No. 60/240,011, filed on Oct. 13, 2000.

(51) Int. Cl.$^7$ ............................................. G06F 13/00
(52) U.S. Cl. ........................ 709/217; 709/225; 709/245
(58) Field of Search ................................ 709/200–203, 709/217–219, 223–225, 245

(56) References Cited

U.S. PATENT DOCUMENTS

| | | | |
|---|---|---|---|
| 4,593,155 A | 6/1986 | Hawkins ..................... | 455/411 |
| 4,908,848 A | 3/1990 | Hanawa ...................... | 455/565 |
| 5,036,532 A | 7/1991 | Metroka et al. ............ | 455/566 |
| 5,109,403 A | 4/1992 | Sutphin ...................... | 455/419 |
| 5,243,653 A | 9/1993 | Malek et al. ............... | 380/272 |
| 5,297,192 A | 3/1994 | Gerszberg .................. | 455/419 |
| 5,398,285 A | 3/1995 | Borgelt et al. ................. | 380/30 |
| 5,781,723 A | 7/1998 | Yee et al. ................... | 713/200 |
| 5,936,887 A | 8/1999 | Choi et al. ............. | 365/185.17 |
| 5,938,726 A * | 8/1999 | Reber et al. ................. | 709/217 |
| 6,078,806 A | 6/2000 | Heinonen et al. ........... | 455/306 |
| 6,091,956 A | 7/2000 | Hollenberg .............. | 455/456.5 |
| 6,108,727 A | 8/2000 | Boals et al. .................. | 710/68 |
| 6,128,389 A | 10/2000 | Chan et al. ................. | 380/247 |
| 6,137,473 A | 10/2000 | Cortopassi et al. ......... | 345/156 |
| 6,279,153 B1 | 8/2001 | Bi et al. ..................... | 717/171 |
| 6,300,947 B1 * | 10/2001 | Kanevsky ................... | 715/866 |
| 6,311,180 B1 * | 10/2001 | Fogarty .......................... | 707/4 |
| 6,366,487 B1 | 4/2002 | Yeom .......................... | 365/52 |
| 6,421,781 B1 * | 7/2002 | Fox et al. ................... | 713/201 |
| 6,424,827 B1 | 7/2002 | McGregor et al. .......... | 455/411 |
| 6,445,914 B1 | 9/2002 | Findikli et al. ............. | 455/411 |
| 6,457,060 B1 * | 9/2002 | Martin et al. ............... | 709/245 |
| 6,473,609 B1 * | 10/2002 | Schwartz et al. ........... | 455/406 |
| 6,587,873 B1 * | 7/2003 | Nobakht et al. ............ | 709/219 |
| 6,628,934 B2 | 9/2003 | Rosenberg et al. ......... | 455/411 |
| 6,654,786 B1 * | 11/2003 | Fox et al. ................... | 709/203 |
| 6,662,023 B1 | 12/2003 | Helle .......................... | 455/558 |
| 6,696,919 B1 | 2/2004 | Leickel et al. ............. | 340/5.74 |
| 6,697,860 B1 * | 2/2004 | Kung .......................... | 709/225 |
| 6,745,223 B1 * | 6/2004 | Nobakht et al. ............ | 709/200 |
| 2002/0012329 A1 | 1/2002 | Atkinson et al. ........... | 370/330 |
| 2002/0080741 A1 | 6/2002 | Toyoshima | |
| 2002/0081993 A1 | 6/2002 | Toyoshima | |
| 2002/0082048 A1 | 6/2002 | Toyoshima | |
| 2002/0085530 A1 | 7/2002 | Toyoshima | |
| 2002/0087759 A1 | 7/2002 | Toyoshima | |
| 2002/0174190 A1 | 11/2002 | Toyoshima | |

OTHER PUBLICATIONS

U.S. Appl. No. 09/976,455, filed Oct. 11, 2001, Toyoshima.

* cited by examiner

Primary Examiner—Moustafa M. Meky
(74) Attorney, Agent, or Firm—John L. Rogitz (57) ABSTRACT

An apparatus and method for providing data to a mobile device, including inserting a wireless module into a host mobile device, transferring data about device type from the host mobile device to the wireless module, retrieving from a memory device by the wireless module, website addresses associated with the device type data, and accessing the website addresses retrieved using the host mobile device with the wireless module coupled therein.

21 Claims, 6 Drawing Sheets

| TYPE | Address |
|------|---------|
| PC | http://www.sony.com/pc |
| PDA | http://www.sony.com/pda |
| DSC | http://www.sony.com/dsc |
| ... | ... |

DEFAULT PORTAL SITE ACCESS WITH WIRELESS MODULE

CROSS REFERENCE TO RELATED DOCUMENTS

This application incorporates herein by reference U.S. patent application Ser. No. 09/972,761, of Akihiko Toyoshima, for SYSTEM AND METHOD FOR ACTIVATION OF A WIRELESS MODULE, filed Oct. 5, 2001, still pending; U.S. patent application Ser. No. 09/976,455, of Akihiko Toyoshima, for HOME NETWORK USING WIRELESS MODULE, filed Oct. 11, 2001, still pending; U.S. patent application Ser. No. 09/972,760, of Akihiko Toyoshima, for MULTIPLE WIRELESS FORMAT PHONE SYSTEM AND METHOD, filed Oct. 5, 2001; U.S. patent application Ser. No. 09/974,724 of Akihiko Toyoshima, for WIRELESS MODEM MODULE SERVER SYSTEM, filed Oct. 9, 2001, still pending; U.S. patent application Ser. No. 09/972,183, of Akihiko Toyoshima, for WIRELESS MODULE SECURITY SYSTEM AND METHOD, filed Oct. 5, 2001, still pending; and U.S. patent application Ser. No. 09/928,582, of Baranowski, et al.; for WIRELESS MODULE, filed Aug. 13, 2001, now abandoned, and Provisional patent application Ser. No. 60/240,011; of Juan, et al, for PORTABLE WIRELESS MODEM, filed Oct. 13, 2000.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

1. Field of the Invention

The present invention is directed to a system for automatically matching device types with portal addresses. More particularly, this invention provides a system in which various network portal addresses associate with a particular type of mobile device, wherein the type specific portal addresses being automatically downloaded thereto without the user having to undergo the cumbersome procedure of logging onto and searching for the appropriate internet web sites.

2. Background of the Invention

There is an ever increasing number of mobile internet users world wide. Therefore, it follows that there will be an increase in Internet usage within the number of web sites that provide various services for Internet use, and in the way and manner in which the web site addresses are communicated to mobile web users. Many of these web sites provide more than simple information, they also facilitate the processing and conversion of data provided to the mobile device.

Figure 1:
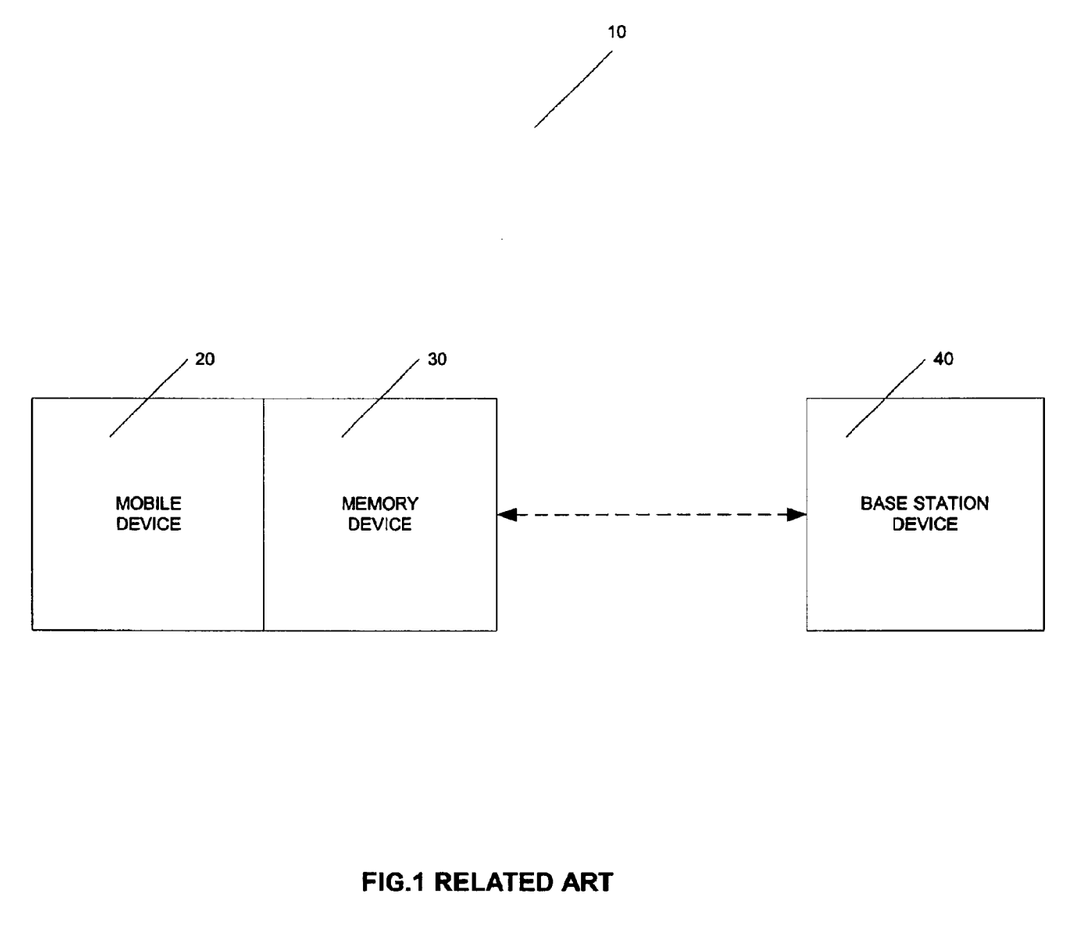
FIG. 1 is a diagram illustrating an overview of a related system.

Referring to the drawings, FIG. 1 is an example of a related art diagram showing a wireless mobile device 20 coupled to a memory stick 30 and a base station device 40. Therein, information on web sites and the like is first transferred from the host device to the memory stick, whereupon, a user would decouple the memory stick from the host device and couple it to a mobile device so that the data on the memory stick can be read by the mobile device. Such memory data may be transferred to the memory of the mobile device or kept on the memory stick data memory.

Further, this process can be repeated several times depending on how much data needs to be transferred or browsed through using the mobile device 20.

However, in order to use the services provided by these web sites, a mobile user must have knowledge of the individual web sites. In order to obtain the needed information, a website directory may be provided that is updatable by both the host and the wireless device.

There remains a general need in the related art for continuously updating the web sites associated with the type of mobile device, and storing this information on the mobile communications device, or at a host device.

There remains an additional need for a tabular system that can work equally well with a number of different mobile devices, including PDA's, digital cameras, e-books, etc. . . ., and can also operate with an user's desktop, PC or other kinds of network services.

There remains still another need for a system and method that provides a transparent, secure delivery of the tabular information of the device type and web site addresses from the host system to the mobile devices, or vice-versa.

SUMMARY OF THE INVENTION

The present invention overcomes the problems of the related art in an easy to use manner. Hence, it is desired that a mobile wireless user can easily select a web site application associated with a particular "type of" mobile device.

The present disclosure provides methods and apparatus for implementing a website applications system for a wireless device including inserting a wireless module into a host mobile device, transferring data about device type from said host mobile device to said wireless module, retrieving from a memory device by said wireless module, website addresses associated with the device type data, and accessing the website addresses retrieved using the host mobile device with the wireless module coupled therein.

In another implementation, the present disclosure provides a system for providing data to a mobile device, including wireless module device inserted into a host mobile device wherein the wireless module device receives data about a device type from said host mobile device, a memory device coupled to the wireless module for retrieving website addresses associated with the device type data, and a user interface coupled to the host mobile device for accessing the website addresses retrieved.

In another implementation, the present disclosure provides a system for providing internet website applications, comprising: a host device having a memory device for storing a plurality of device type data and website addresses, a host agent for correlating the device type data with the website addresses and having a matching device for matching a mobile device with the type data thereby generating a set of web site data associated therewith, the mobile device having a wireless module for connecting to the host device for receiving type data and website addresses, wherein the wireless module having memory device for storing the received type data and website addresses, and coupled to a user module for listing the website address so a user can select the desired website address.

The features of the invention are believed to be novel, set forth with particularity in the appended claims. The invention itself, however, both as to organization and method of operation, together with the further objects and advantages thereof, maybe best understood by reference to the following description taken in conjunction with the accompanied drawings.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to a preferred embodiment(s), it will be understood that various changes and modifications may be made without departing from the spirit and scope of this invention. It is intended that the appended claims be interpreted to cover the embodiments described herein and all equivalents thereto.

Figure 2:
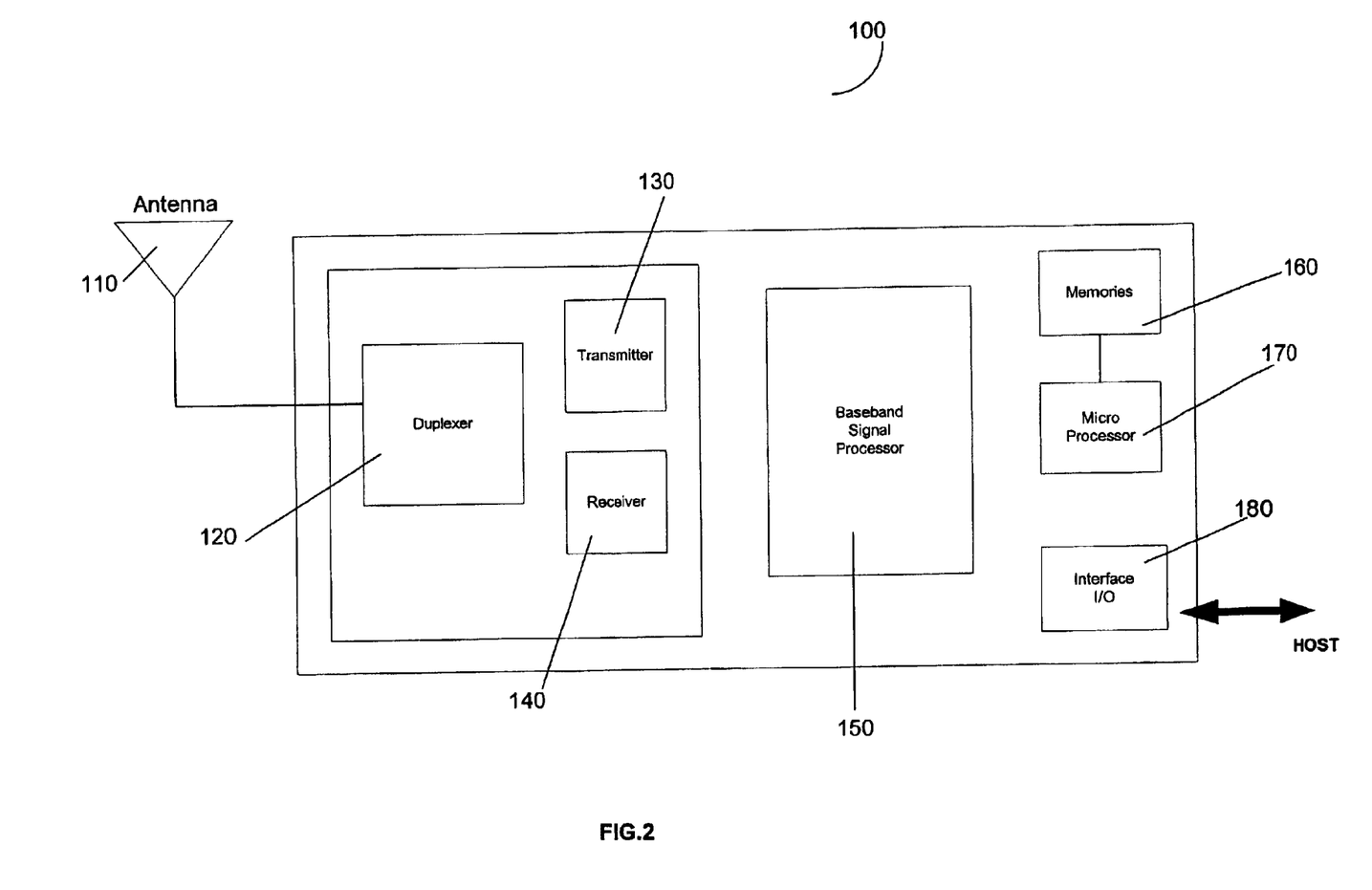
FIG. 2 shows a block diagram illustrating the wireless modem module.
Figure 3:
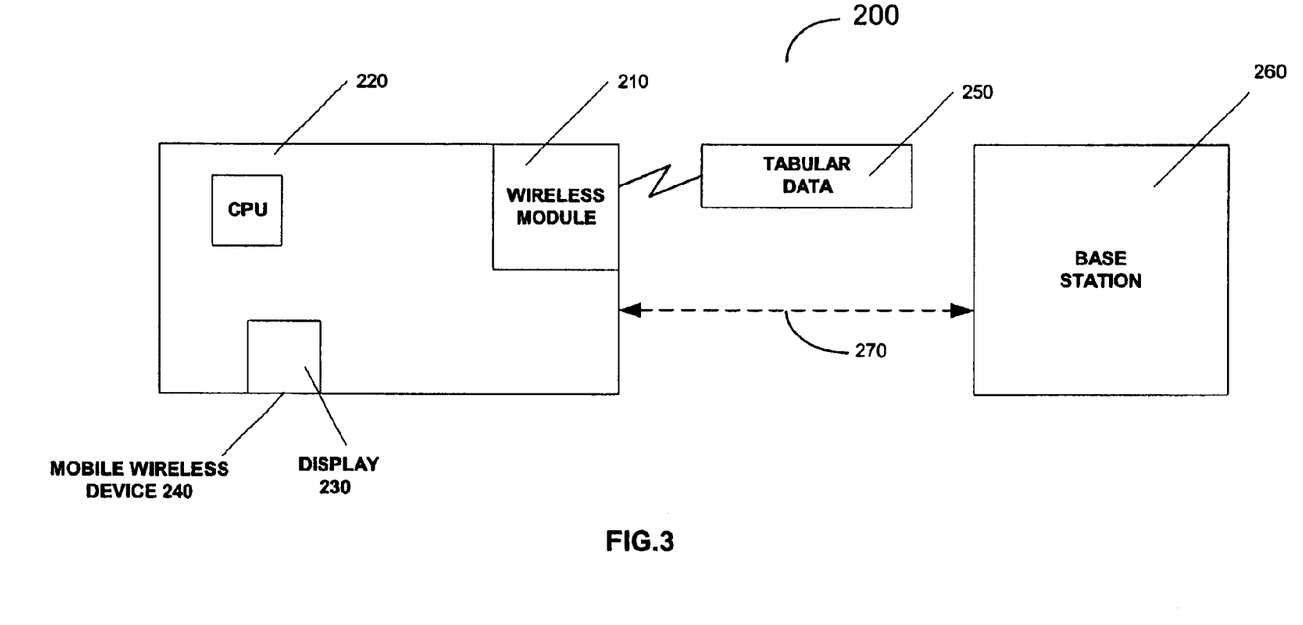
FIG. 3 shows a block diagram of an illustrated embodiment of a system according to the present invention.

FIG. 2 is an example of a system block diagram of one implementation of the wireless module corresponding to the wireless module of FIG. 3

The wireless module 100 includes an antenna 110 providing a wireless connection to a base station, and coupled to a transceiver circuit. The transceiver circuit includes a duplexer 120, a transmitter 130 and a receiver 140. The transmitter 130 and receiver 140 of the transceiver unit are connected to a baseband signal processor 150. The baseband signal processor circuit 150 is also connected to a microprocessor 170, memories 160, an interface input/output 180. A host peripheral device may be connected to the wireless module 100 through the I/O interface.

In operation, the wireless module 100 receives signals containing data packets via the antenna 110 and forwards these signals to the duplexer via the receiver 140. The baseband signal processing circuit then receives the signals 150 and the data signals are forwarded to a micro false processor through the I/O interface to a host. The host may, for example, be a PC, laptop, PDA wireless device, telephone or other kind of mobile or host unit. The wireless module 100 can be implemented to be compatible with various wireless formats such as CDMA one (IS-95), cDMA 2000 1x or 1xEV, or the like and in the future, D.S.R.C. (dedicate short range communications).

The baseband signal processor 150 includes a modulation/demodulation unit connected to a data transfer unit wherein the modulation/demodulation unit converts to receive signals to a baseband signal and supplies the demodulation signal to the data transfer unit where data packets are extracted.

Further, the baseband processor 150 includes an optional data packetized, depacketized unit for packetizing prepacketizing transmission signals and receiving signals prior to transmission signals and receive signals to receiver circuit and microprocessor 170.

Turning now to FIG. 3, a system block diagram 200 of the present invention is shown. The present invention includes the above wireless module 210 coupled to a mobile device which may include a display 230, CPU 220 and tabular data 250. The wireless module 210 is coupled to a base station device 260 (or server device or the like), which has a wireless communication interface 270.

A microprocessor controls the base station 260, which is coupled to the communications module 210 and controls the operation of the mobile wireless device 240 and the interchange of data through the wireless coupling 270, which directs the operation of the base station 260.

When the mobile wireless device 240 is purchased, it is provided with a software application located on a disk, for example, providing the base station 260 software that enables the user to provide the specified "type of" device addresses and web sites associated therewith. The user would, for example, be able to select a storage server, or a storage device, depending on the kind of mobile device being used. Further, this information can simply be preloaded on a memory stick or other kind of data collection device. A base station device would, for example, transfer the data to the wireless module or all of this information can be downloaded via a wireless coupling or memory card reader to removable memory module, which could be coupled to the mobile device or be received by the mobile device through a wireless coupling or a USB connection or the like.

More importantly, the wireless coupling would enable the host device 260 to update information of the mobile device type or web site addresses having applications. Accordingly, the wireless coupling 270 would enable web site applications most used to be prioritized.

Figure 5A:
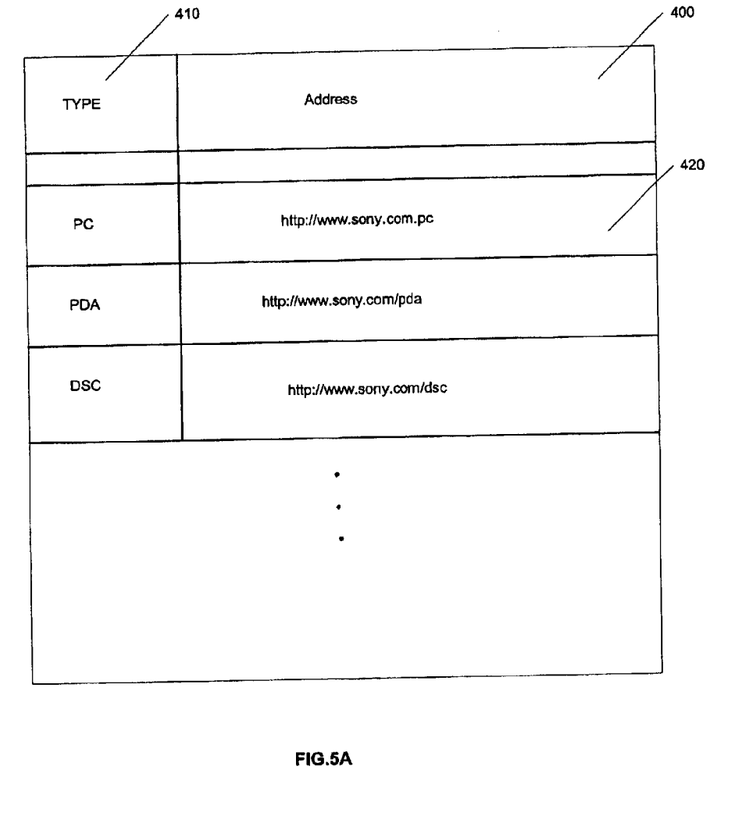
FIGS. 5a and 5b show a block diagram of an illustrated embodiment of a system according to the present invention.

An example of the storing of the "type of" device data and website addresses associated therewith is a list shown in FIG. 5a, having the device "type of" and web site address. This list could be found on the mobile device, memory module or at a remote storage device. The "type of" device data is shown in one column and the website address data is shown in another column, and the type address 410 and website address 420 are correlated together in the table.

Further, for a specific wireless device, the base station device could forward web site addresses associated with that wireless device, via the wireless coupling 270. Accordingly, the wireless device may only need less data of the web sites associated with the particular type of wireless device than the web site addresses stored at the base station device.

As an example, if the wireless mobile device is a camera, the user would want to use web sites associated with digital photography. Such web sites would be, for example, AOL Pictures, Sony's Image Station, Yahoo Pictures, ShutterFly.com, and other digital photography web sites. Accordingly, the digital camera could access these web applications easily and the user could pick and choose which digital photography sites they would want to use. This prevents the user from having to go through a cumbersome process of searching the internet for all digital photography sites associated with the product they are using.

Moreover, the wireless device would be able to display these sites using its display and/or select the sites from the reduced list.

Figure 4:
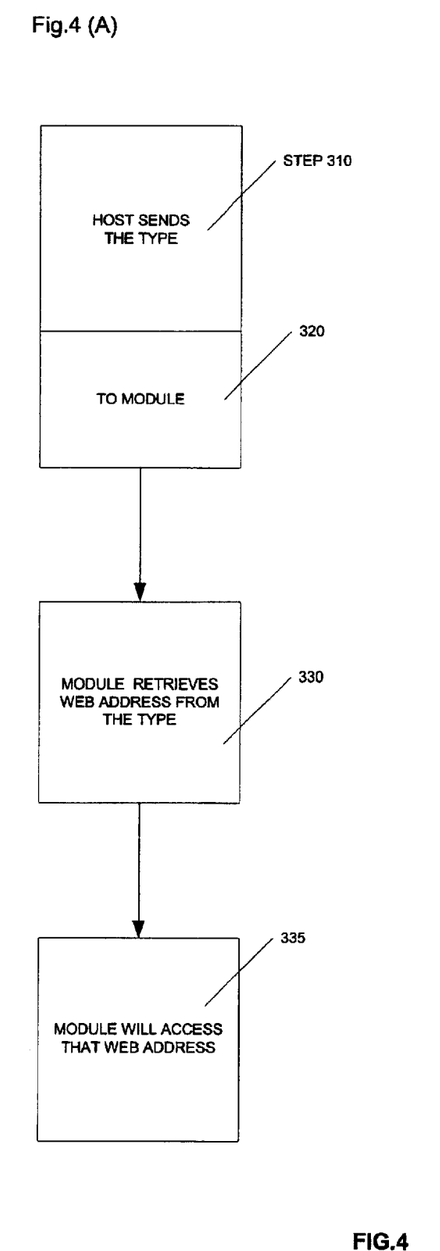
FIGS. 4a and 4b show a block diagram in more detail, illustrating an overview of a tabular system according to the present invention.

Turning now to FIG. 4a, there is shown another embodiment of the present invention where a host sends the type of device data to the wireless module in step 310. In step 320, the wireless module retrieves the web addresses from the type. In the third step (330, 335), the wireless module will access and retrieve the web addresses.

FIG. 4b shows a base station sending the web site address to the wireless module 340 and the wireless module accessing the web address, step 350.

Figure 5B:
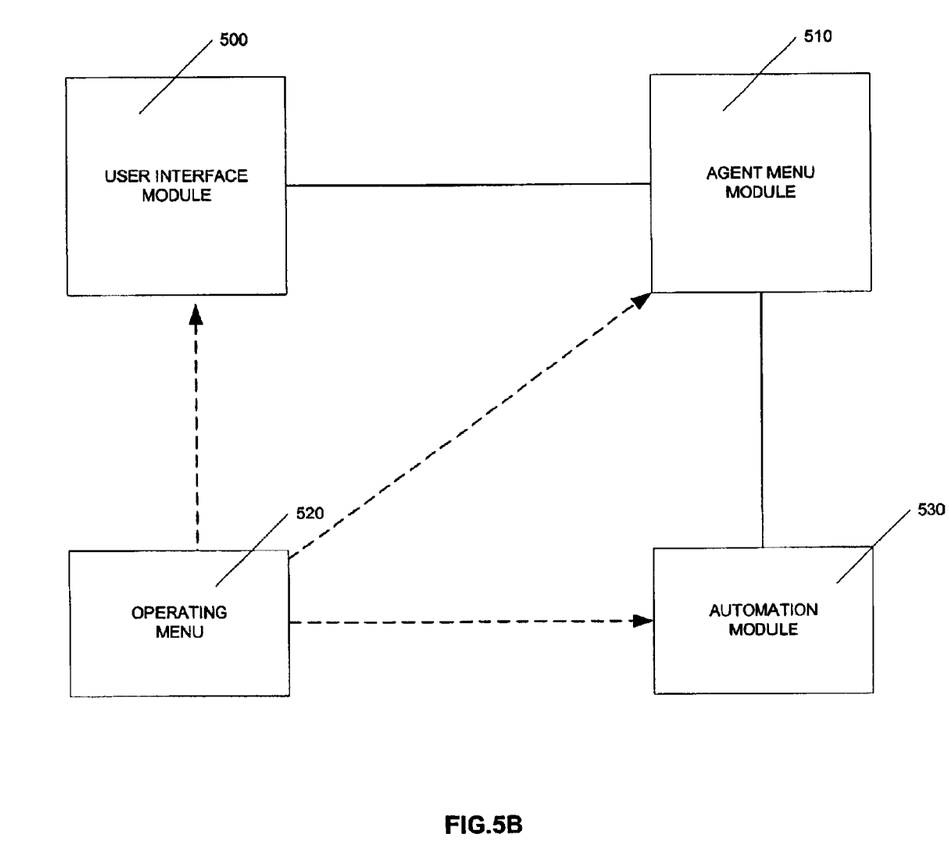

FIG. 5b, shows a high level software diagram of an example of software application modules for the above described system. For example, the user interface module 500 would enable the user to determine which display of lists of web sites according to the particular "type of" device.

The agent menu module 510 would receive the web site data and would have a two way communication with the mobile host device so the web site data can be continuously updated. The automatic module would receive instructions from the user interface module 500 and instruct the agent menu, as to which internet addresses to access. The operating module 520 would operate the automation module 530 to access the correct internet websites as instructed by the user and website address information contained by the agent module.

In the present invention, as described above, user convenience is realized by making it possible to automatically use web sites associated with a particular device, without the user having to log onto an internet service and search websites and repeatedly inputting search information.

Further, such information is continuously updated by the servers at the host device by the most frequent internet service sites being used. Also, the user set up can be updated with the same parameters, regardless of the mobile device.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for providing data to a mobile device, comprising:
    inserting a wireless module into a host mobile device,
    transferring data about device type from said host mobile device to said wireless module,
    retrieving from a memory device by said wireless module, website addresses associated with the device type data, and
    accessing the website addresses retrieved using the host mobile device with the wireless module coupled therein.

2. The method according to claim 1, wherein said memory device being located at a base station device.

3. The method according to claim 1, wherein said memory device being located at said wireless module.

4. The method according to claim 1, wherein said memory device being located at said host mobile device.

5. The method according to claim 1, further comprising:
    arranging the device type data and the website addresses associated therewith in a table enabling accessing by the host mobile device.

6. The method according to claim 5, further comprising:
    updating the table by receiving website addresses and associated device type data to the host mobile device either manually or from a base station device via the wireless module.

7. A system for providing data to a mobile device, comprising:
    wireless module device inserted into a host mobile device wherein the wireless module device receives data about a device type from said host mobile device,
    a memory device coupled to the wireless module for retrieving website addresses associated with the device type data, and
    an user interface coupled to the host mobile device for accessing the website addresses retrieved.

8. The system according to claim 7, wherein said memory device being located at a base station device.

9. The system according to claim 7, wherein said memory device being located at said wireless module.

10. The system according to claim 7, wherein said memory device being located at said host mobile device.

11. The system according to claim 7, further comprising:
    a table arranging device type data and the website addresses associated therewith enabling accessing by the host mobile device.

12. The system according to claim 11, further comprising:
    means for updating the table by receiving website addresses and associated device type data to the host mobile device either manually or from a base station device via the wireless module.

13. A system for providing internet application services to a wireless device, comprising:
    a user interface module for receiving user commands and performing operations according to the commands,
    an agent menu module performing operations to connect to the internet wherein the agent menu module including both type device data and corresponding web addresses for accessing the internet address,
    an automation module for receiving instructions from the user interface module and instructing the agent menu module which internet addresses to access, and
    an operating means for operating the automation module to access the selected internet addresses as instructed by the user commands received from the user interface module and website addresses of the agent menu module.

14. The system according to claim 13, further comprising:
    the user interface allowing the user to scroll through a list of websites choosing a website from the list of websites generated by the automation module from device type data and corresponding websites addresses.

15. A system for providing internet website applications, comprising:
    a server device having a memory means for storing a plurality of device type data and website addresses,
    a server agent for correlating the device type data with the website addresses and having a matching means for matching a mobile device with the type data thereby generating a set of web sites data associated therewith,
    said mobile device having a wireless module for connecting to the server device for receiving type data and website addresses,
    wherein the wireless module having memory means for storing the received type data and website addresses, and coupled to a user module for listing the website address so a user can select the desired website address.

16. The system according to claim 15, further comprising:
    a connection means for coupling the wireless device to the server device, wherein the connection means enabling two way data flow between the mobile device and the server device.

17. The system according to claim 16, wherein the server device sending updates of the device type data and web site addresses to the mobile device.

18. The system according to claim 17, wherein the mobile device storing the most frequently used website addresses.

19. A method for providing internet website applications, comprising:
- storing a plurality of device type data and website addresses at a memory location of a server device,
- correlating the device type data with the website addresses at a host agent having a matching means for matching a mobile device with the device type data thereby generating a set of web sites data associated therewith,
- said mobile device having a wireless module for connecting to the server device for receiving device type data and website addresses,
- wherein the wireless module having memory means for storing the received device type data and website addresses from the host agent, and coupled to a user module for listing the website address so a user can select the desired website addresses.

20. The method according to claim 19, comprising:
- sending new device type data and website addresses to the host agent from a server device periodically.

21. A system for providing internet website applications, comprising:
- a host means having a memory means for storing a plurality of device type data and website addresses,
- a host agent means for correlating the device type data with the website addresses and having a matching means for matching a mobile device with the type data thereby generating a set of web sites data associated therewith,
- said mobile device means having a wireless module for connecting to the host device for receiving type data and website addresses,
- wherein the wireless module means having memory means for storing the received type data and website addresses, and coupled to a user module for listing the website address so a user can select the desired website address.

* * * * *